United States Patent
Jung et al.

(10) Patent No.: US 10,899,900 B2
(45) Date of Patent: Jan. 26, 2021

(54) THERMOPLASTIC RESIN COMPOSITION FOR LASER DIRECT STRUCTURING, AND MOLDED ARTICLE COMPRISING SAME

(71) Applicant: LOTTE ADVANCED MATERIALS CO., LTD., Yeosu-si (KR)

(72) Inventors: Yoo Jin Jung, Uiwang-si (KR); Ik Mo Kim, Uiwang-si (KR); Jung Ki Kim, Uiwang-si (KR); Jee Kwon Park, Uiwang-si (KR); Sang Hyun Hong, Uiwang-si (KR)

(73) Assignee: Lotte Advanced Materials Co., Ltd., Yeosu-si (KR)

( * ) Notice: Subject to any disclaimer, the term of this patent is extended or adjusted under 35 U.S.C. 154(b) by 0 days.

(21) Appl. No.: 16/473,302

(22) PCT Filed: Dec. 20, 2017

(86) PCT No.: PCT/KR2017/015147
§ 371 (c)(1),
(2) Date: Jun. 25, 2019

(87) PCT Pub. No.: WO2018/124611
PCT Pub. Date: Jul. 5, 2018

(65) Prior Publication Data
US 2020/0148849 A1    May 14, 2020

(30) Foreign Application Priority Data

Dec. 26, 2016 (KR) .................. 10-2016-0179153

(51) Int. Cl.
| | |
|---|---|
| *C08F 2/46* | (2006.01) |
| *C08F 2/50* | (2006.01) |
| *C08G 61/04* | (2006.01) |
| *C08J 7/12* | (2006.01) |
| *C08K 3/22* | (2006.01) |
| *C08K 3/30* | (2006.01) |
| *C08K 3/40* | (2006.01) |
| *C08K 7/14* | (2006.01) |
| *B29C 45/00* | (2006.01) |
| *B29K 69/00* | (2006.01) |
| *B29K 309/08* | (2006.01) |
| *B29K 509/02* | (2006.01) |

(52) U.S. Cl.
CPC .............. *C08J 7/123* (2013.01); *C08K 3/22* (2013.01); *C08K 3/30* (2013.01); *C08K 3/40* (2013.01); *C08K 7/14* (2013.01); *B29C 45/0005* (2013.01); *B29C 45/0053* (2013.01); *B29C 2045/0079* (2013.01); *B29K 2069/00* (2013.01); *B29K 2309/08* (2013.01); *B29K 2509/02* (2013.01); *B29K 2995/003* (2013.01); *B29K 2995/0082* (2013.01); *B29K 2995/0089* (2013.01); *C08J 2369/00* (2013.01); *C08K 2003/2241* (2013.01); *C08K 2003/3036* (2013.01); *C08K 2201/014* (2013.01)

(58) Field of Classification Search
CPC ......... C08J 7/123; C08J 2369/00; C08K 3/30; C08K 3/40; C08K 3/22; C08K 7/14; C08K 2201/014; C08K 2003/2241; C08K 2003/3036; B29K 2995/0082; B29K 2995/0089; B29K 2045/0079; B29K 2069/00; B29K 2309/08; B29K 2509/02; B29C 45/0079; B29C 45/0005; B29C 45/0053
USPC ................ 522/2, 1, 71, 189, 184, 6; 520/1
See application file for complete search history.

(56) References Cited

U.S. PATENT DOCUMENTS

| | | | |
|---|---|---|---|
| 8,309,640 B2 | 11/2012 | Li et al. | |
| 2015/0175803 A1* | 6/2015 | Stoppelmann | ....... H05K 5/0247 428/35.7 |
| 2016/0295705 A1 | 10/2016 | Stoppelmann | |
| 2017/0137660 A1 | 5/2017 | Sugiyama et al. | |

FOREIGN PATENT DOCUMENTS

| | | | |
|---|---|---|---|
| CN | 104725847 A | | 6/2015 |
| CN | 105452527 A | | 3/2016 |
| JP | 2015-108124 A | | 6/2015 |
| JP | 2015108124 | * | 6/2015 |
| JP | 2015-166460 A | | 9/2015 |
| JP | 2016-097589 A | | 5/2016 |
| JP | 2016-183422 A | | 10/2016 |
| KR | 10-2011-0018319 A | | 2/2011 |
| KR | 10-2016-0100935 A | | 8/2016 |
| WO | 2015/060323 A1 | | 4/2015 |

(Continued)

OTHER PUBLICATIONS

Buxbaum et al, Industrial Inorganic Pigments, Chapter 2, 2005, 51-97 (Year: 2005).*

(Continued)

*Primary Examiner* — Jessica Whiteley
(74) *Attorney, Agent, or Firm* — Additon, Higgins & Pendleton, P.A.

(57) ABSTRACT

The present invention relates to a thermoplastic resin composition for laser direct structuring, containing: a polycarbonate resin; an inorganic compound comprising titanium dioxide and zinc sulfide; a fibrous inorganic filler; and an additive for laser direct structuring. Therefore, the present invention can provide: a thermoplastic resin composition for laser direct structuring, capable of implementing excellent whiteness while maintaining excellent impact resistance and rigidity; and a molded article comprising the same.

16 Claims, No Drawings

(56) References Cited

FOREIGN PATENT DOCUMENTS

WO      2016/002660  A1      1/2016
WO      2018/124611  A1      7/2018

OTHER PUBLICATIONS

Mogi, JP 2015108124 Machine Translation, Jun. 11, 2015 (Year: 2015).*
Mogi, JP 2015108124 Translation of table 1 and 2, Jun. 11, 2015 (Year: 2015).*
International Search Report in counterpart International Application No. PCT/KR2017/015147, dated Mar. 30, 2018, pp. 1-4.
Office Action in counterpart Chinese Application No. 201780080678.7 dated Nov. 24, 2020, pp. 1-7.
English-translation of Office Action in counterpart Chinese Application No. 201780080678.7 dated Nov. 24, 2020, pp. 1-7.

* cited by examiner

THERMOPLASTIC RESIN COMPOSITION FOR LASER DIRECT STRUCTURING, AND MOLDED ARTICLE COMPRISING SAME

CROSS-REFERENCE TO RELATED APPLICATIONS

This application claims priority to and the benefit of International Application No. PCT/KR2017/015147, filed Dec. 20, 2017, which published as WO 2018/124611 on Jul. 5, 2018; and Korean Patent Application No. 10-2016-0179153, filed in the Korean Intellectual Property Office on Dec. 26, 2016, the entire disclosure of each of which is incorporated herein by reference.

TECHNICAL FIELD

The present invention relates to a thermoplastic resin composition for laser direct structuring and a molded article comprising the same. More particularly, the present invention relates to a thermoplastic resin composition for laser direct structuring, which can realize good whiteness while maintaining good impact resistance and rigidity, and a molded article comprising the same.

BACKGROUND ART

A laser direct structuring (LDS) process is a pretreatment method for coating a metal layer on a surface of a resin material. Such laser direct structuring can modify a plating target to have suitable properties for plating by irradiating the surface of the resin material with laser beams in a shape corresponding to the plating target.

In general, for a resin material applicable to laser direct structuring, a resin composition contains an additive for laser direct structuring. The additive for laser direct structuring is decomposed to discharge metal atoms by laser beams reaching the surface of the resin material, thereby forming metal nuclei. Such metal nuclei are buried in a fine size in the region irradiated with laser beams, thereby increasing not only surface roughness, but also plateability by acting as crystal nuclei upon plating.

Laser direct structuring allows rapid and economic formation of electronic/electric circuits on a three-dimensional shape of a molded article. For example, laser direct structuring may be advantageously used in manufacture of antennas for portable electronic devices, radio frequency identification (RFID) antennas, and the like.

In recent years, with increasing tendency of reduction in weight and thickness of a product printed with electric/electronic circuits, there is increasing demand for a thermoplastic resin composition which can exhibit excellent mechanical properties and molding processability. In addition, a thermoplastic resin composition capable of realizing various colors is also demanded corresponding to various colors of portable electronic devices and the like.

Therefore, there is a need for development of a thermoplastic resin composition for laser direct structuring, which can realize good whiteness while maintaining good impact resistance and rigidity, and a molded article including the same.

The background technique of the present invention is disclosed in Korean Patent Laid-open Publication No. 2011-0018319.

DISCLOSURE

Technical Problem

It is an aspect of the prevent invention to provide a thermoplastic resin composition for laser direct structuring, which can realize good whiteness while maintaining good impact resistance and rigidity, and a molded article formed of the same.

Technical Solution

One aspect of the present invention relates to a thermoplastic resin composition for laser direct structuring, including: a polycarbonate resin; an inorganic compound containing titanium dioxide and zinc sulfide; a fibrous inorganic filler; and an additive for laser direct structuring.

The thermoplastic resin composition may include: about 50% by weight (wt %) to about 80 wt % of the polycarbonate resin; about 1 wt % to about 15 wt % of the inorganic compound containing titanium dioxide and zinc sulfide; about 10 wt % to about 40 wt % of the fibrous inorganic filler; and about 1 wt % to about 10 wt % of the additive for laser direct structuring.

The titanium dioxide and the zinc sulfide may have a hardness difference of about 2 to about 5, as calculated by Equation 1.

$$\text{Hardness difference } (\Delta \text{Mohs}) = |(MH1 - MH2)|, \quad [\text{Equation 1}]$$

where MH1 indicates Mohs's hardness of the titanium dioxide and MH2 indicates Mohs's hardness of the zinc sulfide.

In Equation 1, MH1 may range from about 5.5 to about 7.5 and MH2 may range from about 2.5 to about 3.5.

The titanium dioxide and the zinc sulfide may be present in a weight ratio of about 1:0.1 to about 1:5.

The fibrous inorganic filler may include at least one of glass fibers, carbon fibers, silica fibers, and ceramic fibers.

The fibrous inorganic filler may include glass fibers having an average diameter of about 5 μm to about 20 μm in cross-section, as measured by an optical microscope, and a pre-processing average length of about 2 mm to about 5 mm.

The additive for laser direct structuring may include at least one of a heavy metal composite oxide spinel and a copper salt.

The additive for laser direct structuring may be the copper salt. Here, the copper salt may include at least one of copper hydroxide phosphate, copper phosphate, copper sulfate, cuprous thiocyanate, and copper chromite.

The additive for laser direct structuring may be the heavy metal composite oxide spinel. Here, the heavy metal composite oxide spinel may be a compound represented by Formula 1.

$$AB_2O_4, \quad [\text{Formula 1}]$$

where A is cadmium, chromium, manganese, nickel, zinc, copper, cobalt, iron, magnesium, tin, or titanium, and B is chromium, iron, aluminum, nickel, manganese, molybdenum, antimony, bismuth, or tin.

The polycarbonate resin and the additive for laser direct structuring may be present in a weight ratio of about 3:1 to about 80:1.

Another aspect of the present invention relates to a molded article formed of the thermoplastic resin composition for laser direct structuring set forth above.

The molded article may have an Izod impact strength of about 10 kgf·cm/cm to about 20 kgf·cm/cm, as measured on a ⅛" thick notched Izod specimen in accordance with ASTM D256.

The molded article may have a flexural modulus of about 60,000 kgf/cm² to about 80,000 kgf/cm², as measured in accordance with ASTM D790.

The molded article may have an average weight-dropping fracture height of about 65 cm to about 90 cm, at which dropping a weight on an injection-molded specimen having a size of 2 mm×5 cm×20 cm (thickness×width×length) results in 50% breakage of the specimen in a DuPont drop test after aging at room temperature for 6 hours.

The molded article may have a luminance (L*) of about 65 to about 90, as measured in accordance with the Commission Internationale de l'Eclairage (CIE) Lab.

Advantageous Effects

The present invention provides a thermoplastic resin composition for laser direct structuring, which can realize good whiteness while maintaining good impact resistance and rigidity, and a molded article formed of the same.

BEST MODE

One aspect of the present invention relates to a thermoplastic resin composition for laser direct structuring, including: a polycarbonate resin; an inorganic compound containing titanium dioxide and zinc sulfide; a fibrous inorganic filler; and an additive for laser direct structuring. The present invention provides a thermoplastic resin composition for laser direct structuring, which can realize good whiteness while maintaining good impact resistance and rigidity, and a molded article including the same.

(A) Polycarbonate Resin

According to the present invention, the polycarbonate resin may include any typical polycarbonate resin used in typical thermoplastic resin compositions. For example, the polycarbonate resin may be an aromatic polycarbonate resin prepared by reacting diphenols (aromatic diol compounds) with a carbonate precursor, such as phosgene, halogen formate, or carbonate diester.

Examples of the diphenols may include 4,4'-biphenol, 2,2-bis(4-hydroxyphenyl)propane, 2,4-bis(4-hydroxyphenyl)-2-methylbutane, 1,1-bis(4-hydroxyphenyl)cyclohexane, 2,2-bis(3-chloro-4-hydroxyphenyl)propane, 2,2-bis(3,5-dichloro-4-hydroxyphenyl)propane, 2,2-bis(3-methyl-4-hydroxyphenyl)propane, and 2,2-bis(3,5-dimethyl-4-hydroxyphenyl)propane, without being limited thereto. For example, the diphenols may be 2,2-bis(4-hydroxyphenyl)propane, 2,2-bis(3,5-dichloro-4-hydroxyphenyl)propane, 2,2-bis(3,5-dimethyl-4-hydroxyphenyl)propane, or 1,1-bis(4-hydroxyphenyl)cyclohexane, specifically 2,2-bis(4-hydroxyphenyl)propane which is also referred to as bisphenol A.

Examples of the carbonate precursor may include dimethyl carbonate, diethyl carbonate, dibutyl carbonate, dicyclohexyl carbonate, diphenyl carbonate, ditolyl carbonate, bis(chlorophenyl) carbonate, m-cresyl carbonate, dinaphthyl carbonate, carbonyl chloride (phosgene), diphosgene, triphosgene, carbonyl bromide, and bishaloformate. These may be used alone or as a mixture thereof.

The polycarbonate resin may be a branched polycarbonate resin. For example, the polycarbonate resin may be prepared by adding a tri- or higher polyfunctional compound, specifically, a tri- or higher valent phenol group-containing compound in an amount of about 0.05 mol % to about 2 mol % based on the total number of moles of the diphenols used in polymerization.

The polycarbonate resin may be a homopolycarbonate resin, a copolycarbonate resin, or a blend thereof. In addition, the polycarbonate resin may be partly or completely replaced by an aromatic polyester-carbonate resin obtained by polymerization in the presence of an ester precursor, for example, a bifunctional carboxylic acid.

In some embodiments, the polycarbonate resin may have a weight average molecular weight (Mw) of about 10,000 g/mol to about 200,000 g/mol, specifically about 15,000 g/mol to about 40,000 g/mol, for example, 15,000 g/mol, 20,000 g/mol, 25,000 g/mol, 30,000 g/mol, 35,000 g/mol, or 40,000 g/mol, as measured by gel permeation chromatography (GPC). Within this range, the thermoplastic resin composition can have good properties in terms of impact resistance, rigidity, and heat resistance.

In some embodiments, the polycarbonate resin may be present in an amount of about 50 wt % to about 80 wt %, specifically about 55 wt % to about 70 wt %, for example, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, or 70 wt %, in the thermoplastic resin composition. Within this range, the thermoplastic resin composition can exhibit good impact resistance, rigidity, and the like.

(B) Inorganic Compound

The inorganic compound includes both titanium dioxide and zinc sulfide to secure a high level of compatibility between impact resistance and whiteness, which are incompatible with each other when the inorganic compound is added to a resin composition.

In some embodiments, the titanium dioxide and the zinc sulfide may be present in a weight ratio of about 1:0.1 to about 1:5, specifically about 1:0.2 to about 1:4.5, for example, 1:0.2, 1:0.5, 1:1, 1:1.5, 1:2, 1:2.5, 1:3, 1:3.5, 1:4, or 1:4.5. Within this range, the thermoplastic resin composition can exhibit further improvement in impact resistance and rigidity, has good whiteness and high balance therebetween, and thus can be advantageously used for products having various colors.

The titanium dioxide may include, for example, rutile stable at high temperature, anatase stable at low temperature, and brookite stable at intermediate temperature, without being limited thereto. In one embodiment, rutile may be used to further improve chemical resistance and heat resistance of the thermoplastic resin composition.

The zinc sulfide may be selected from any kind of zinc sulfide without limitation. The zinc sulfide can further improve chemical resistance and heat resistance of the thermoplastic resin composition in cooperation with the titanium dioxide, while improving whiteness thereof.

In some embodiments, the inorganic compound may contain the titanium dioxide and the zinc sulfide in a total amount of about 1 wt % to about 15 wt %, specifically about 6 wt % to about 10 wt %, for example, 6 wt %, 7 wt %, 8 wt %, 9 wt %, or 10 wt %, in the thermoplastic resin composition. Within this range, the thermoplastic resin composition can exhibit further improved properties in terms of impact resistance, rigidity and whiteness.

The titanium dioxide and the zinc sulfide may have a hardness difference of about 2 to about 5, specifically about 2 to about 4, for example, 2, 3, or 4, as calculated by Equation 1.

Hardness difference (ΔMohs)=|(MH1−MH2)|,   [Equation 1]

where MH1 indicates Mohs's hardness of the titanium dioxide and MH2 indicates Mohs's hardness of the zinc sulfide. Within this range, the thermoplastic resin composition can exhibit good balance between impact resistance and whiteness.

In Equation 1, MH1 may range from about 5.5 to about 7.5, for example, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, or 7.5, and MH2 may range from about 2.5 to about 3.5, for example, 2.5, 2.6, 2.7, 2.8, 2.9, 3, 3.1, 3.2, 3.3, 3.4, or 3.5. Within this range, the thermoplastic resin composition can have further improved rigidity and impact resistance.

(C) Fibrous Inorganic Filler

The fibrous inorganic filler serves to prevent deterioration in properties of the thermoplastic resin composition due to addition of the inorganic compound while further improving impact resistance. In addition, the fibrous inorganic filler provides rigidity to the thermoplastic resin composition.

The fibrous inorganic filler may include at least of glass fiber, carbon fiber, silica fiber and ceramic fiber. In this case, the fibrous inorganic filler can further improve impact resistance.

The fibrous inorganic filler may have an average aspect ratio (length/diameter (L/D)) of about 100 to about 3,000, for example, 100, 500, 1,000, 1,500, 2,000, 2,500, or 3,000, and an average small diameter-to-long diameter ratio of about 1:1 to about 1:2, for example, 1:1, 1:1.5, or 1:2, in cross-section. Within this range, the thermoplastic resin composition can have further improved impact resistance and rigidity.

In some embodiments, the fibrous inorganic filler may be surface-treated with a sizing material to prevent reaction with the resin and to improve a degree of impregnation. Here, surface treatment of the fibrous inorganic filler may be performed during manufacture of the fibrous inorganic filler or during post-processing.

The sizing material may include, for example, an epoxy compound, without being limited thereto. In this case, the fibrous inorganic filler can exhibit good compatibility with the polycarbonate resin.

In some embodiments, the fibrous inorganic filler may be glass fibers having an average diameter of about 5 μm to about 20 μm in cross-section, for example, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, or 20 μm, as measured by an optical microscope, and a pre-processing average length of about 2 mm to about 5 mm, for example, 2 mm, 3 mm, 4 mm, or 5 mm. Within these ranges, the thermoplastic resin composition can have further improved rigidity without deterioration in other properties including external appearance and the like.

In some embodiments, the fibrous inorganic filler may have a cylindrical or plate cross-sectional shape, without being limited thereto.

In some embodiments, the fibrous inorganic filler may be present in an amount of about 10 wt % to 40 wt %, specifically about 20 wt % to about 30 wt %, for example, 20 wt %, 21 wt %, 22 wt %, 23 wt %, 24 wt %, 25 wt %, 26 wt %, 27 wt %, 28 wt %, 29 wt %, or 30 wt %, in the thermoplastic resin composition. Within this range, the thermoplastic resin composition can have good properties in terms of impact resistance, rigidity, external appearance, and the like.

(D) Additive for Laser Direct Structuring

The additive for laser direct structuring (LDS additive) according to one embodiment serves to form metal nuclei upon irradiation with laser beams and may include any typical LDS additive used in resin compositions for LDS.

In some embodiments, the LDS additive may include at least one of a heavy metal composite oxide spinel and a copper salt.

In some embodiments, the heavy metal composite oxide spinel may be represented by Formula 1.

$$AB_2O_4,$$ [Formula 1]

where A is a metal cation having a valence of 2, for example, magnesium, copper, cobalt, zinc, tin, iron, manganese, nickel, and a combination thereof, and B is a metal cation having a valence of 3, for example, manganese, nickel, copper, cobalt, tin, titanium, iron, aluminum, chromium, and a combination thereof.

In some embodiments, the copper salt may include at least one of copper hydroxide phosphate, copper phosphate, copper sulfate, cuprous thiocyanate, and copper chromite.

In some embodiments, the LDS additive may be present in an amount of about 1 wt % to about 10 wt %, for example, about 2 wt % to about 8 wt %, for example, 2 wt %, 3 wt %, 4 wt %, 5 wt %, 6 wt %, 7 wt %, or 8 wt %, in the thermoplastic resin composition. Within this range, the thermoplastic resin composition can have good properties in terms of plating adhesion, impact resistance, rigidity, and whiteness.

In some embodiments, the polycarbonate resin and the LDS additive may be present in a weight ratio of about 3:1 to about 80:1, specifically about 5:1 to about 20:1, more specifically about 10:1 to about 15:1, for example, 10:1, 11:1, 12:1, 13:1, 14:1, or 15:1. Within this range, the thermoplastic resin composition has good efficiency in laser direct structuring, thereby securing further improvement in plating adhesion of a molded article formed thereof.

In some embodiments, the thermoplastic resin composition may further include any typical additive commonly used in thermoplastic resin compositions for LDS without affecting the effects of the present invention, as needed. Examples of the additive may include lubricants, colorants, stabilizers, antioxidants, antistatic agents, and flow enhancers, without being limited thereto. The additive may be present in an amount of about 0.01 parts by weight to about 20 parts by weight, for example, 0.01 parts by weight, 0.05 parts by weight, 0.1 parts by weight, 0.5 parts by weight, 1 parts by weight, 2 parts by weight, 3 parts by weight, 4 parts by weight, 5 parts by weight, 6 parts by weight, 7 parts by weight, 8 parts by weight, 9 parts by weight, 10 parts by weight, 11 parts by weight, 12 parts by weight, 13 parts by weight, 14 parts by weight, 15 parts by weight, 16 parts by weight, 17 parts by weight, 18 parts by weight, 19 parts by weight, or 20 parts by weight, relative to 100 parts by weight of the thermoplastic resin composition.

The thermoplastic resin composition according to one embodiment of the invention may be prepared in pellet form by mixing the aforementioned components, followed by melt extrusion at about 200° C. to about 300° C., for example, at about 250° C. to about 280° C. in a typical twin-screw extruder.

Another aspect of the present invention relates to a molded article formed of the thermoplastic resin composition for laser direct structuring set forth above.

The molded article is formed of the thermoplastic resin composition set forth above. For example, the molded article may be produced by any suitable molding method, such as injection molding, double injection molding, blowing, extrusion, and thermoforming, using the thermoplastic resin composition. The molded article can be easily formed by a person having ordinary skill in the art.

The molded article may have an Izod impact strength of about 10 kgf·cm/cm to about 20 kgf·cm/cm, as measured on a ⅛" thick notched Izod specimen in accordance with ASTM D256.

The molded article may have a flexural modulus of about 60,000 kgf/cm$^2$ to about 80,000 kgf/cm$^2$, for example, about 60,000 kgf/cm$^2$ to about 75,000 kgf/cm$^2$, as measured in accordance with ASTM D790.

The molded article may have an average weight-dropping fracture height of about 65 cm to about 90 cm, specifically about 65 cm to about 85 cm, for example, 65 cm, 66 cm, 67 cm, 68 cm, 69 cm, 70 cm, 71 cm, 72 cm, 73 cm, 74 cm, 75 cm, 76 cm, 77 cm, 78 cm, 79 cm, 80 cm, 81 cm, 82 cm, 83 cm, 84 cm, or 85 cm, at which dropping a weight on an injection-molded specimen having a size of 2 mm×5 cm×20 cm results in 50% breakage of the specimen in a DuPont drop test after aging at room temperature for 6 hours.

The molded article may have a luminance (L*) of about 65 to about 90, specifically about 65 to about 85, for example, 65, 66, 67, 68, 69, 70, 71, 72, 73, 74, 75, 76, 77, 78, 79, 80, 81, 82, 83, 84, or 85, as measured in accordance with the CIE Lab. In this case, the thermoplastic resin composition can realize good impact resistance and high whiteness of the molded article, thereby further improving chroma and clearness upon implementation of a desired color through mixture with various dyes and/or pigments.

Next, the present invention will be described in more detail with reference to some examples. It should be understood that these examples are provided for illustration only and are not to be in any way construed as limiting the present invention.

EXAMPLE

Details of components used in Examples and Comparative Examples are as follows.

(A) Polycarbonate Resin:

A polycarbonate resin (Manufacturer: TEHIN Ltd., Product Name: PANLITE® L-1225Y) having a melt volume flow rate (MVR) of 11.0 cm$^3$/10 min, as measured under conditions of 300° C./1.2 kgf.

(B) Inorganic Compound (b1) Titanium dioxide (TiO$_2$) (Manufacturer: KRONOS Worldwide Inc., Product Name: KRONOS® 2233, Hardness: 6.5 Mohs) was used.

(b2) Zinc sulfide (ZnS) (Manufacturer: Sachtleben Chemie GmbH, Product Name: SACHTOLITH® HD-S, Hardness: 3.0 Mohs) was used.

Here, it could be seen that a hardness difference (ΔMohs) between (b1) and (b2) is 2.5, as calculated by Equation 1.

(C) Fibrous Inorganic Filler:

Glass fiber (Manufacturer: Owens Corning Co. Ltd., Product Name: 910, average diameter in cross-section: 10 μm, pre-processing average length: 4 mm, surface treatment: epoxy compound) was used.

(D) Additive for Laser Direct Structuring:

(d1) Copper chromite (CuCr$_2$O$_4$) (Manufacturer: Shepherd Color, Product Name: Black 1G) was used.

(d2) Copper hydroxide phosphate was used.

Examples 1 to 7 and Comparative Examples 1 to 4

The aforementioned components were weighed in amounts as listed in Table 1 and subjected to extrusion in a twin-screw extruder (Φ: 36 mm) at a barrel temperature of 250° C. to 300° C., thereby preparing thermoplastic resin compositions in pellet form. The prepared pellets were dried at 80° C. to 100° C. for 4 hours and subjected to injection molding using a 6 oz. injection machine (molding temperature: 300° C., mold temperature: 60° C.), thereby preparing specimens for property evaluation. The prepared specimens were evaluated as to the following properties by the following methods and evaluation results are shown in Table 1.

Property Evaluation (1) Rigidity: Flexural modulus was measured under conditions of 2.8 mm/min in accordance with ASTM D790.

(2) Impact resistance: Izod impact strength was measured on a ⅛" thick notched Izod specimen in accordance with ASTM D256.

(3) Practical impact resistance: Practical impact resistance was measured on an injection-molded specimen having a size of 2 mm×5 cm×20 cm (thickness×width×length) by a Dupont drop test method using a weight dropping tester after aging at room temperature for 6 hours or more. Here, an average dropping height corresponding to 50% breakage of the specimen was determined as practical impact resistance thereof by dropping a 1 kg weight on each of 20 specimens to measure a dropping height at which about 50% of each specimen was broken, followed by averaging height values in centimeters.

(4) Whiteness: Initial luminance (L*) at a wavelength of 450 nm was measured using a 3600D CIE Lab. color-difference meter (Konica Minolta Co. Ltd.) under SCI (specular component included) conditions.

TABLE 1

|  | E1 | E2 | E3 | E4 | E5 | E6 | E7 | CE1 | CE2 | CE3 | CE4 |
|---|---|---|---|---|---|---|---|---|---|---|---|
| (A) | 57 | 57 | 57 | 57 | 57 | 67 | 67 | 57 | 57 | 61 | 71 |
| (B)(b1) | 6.5 | 5.6 | 4 | 2.4 | 1.5 | 4 | 2.4 | 8 | — | — | — |
| (B)(b2) | 1.5 | 2.4 | 4 | 5.6 | 6.5 | 4 | 5.6 | — | 8 | 4 | 4 |
| (C) | 30 | 30 | 30 | 30 | 30 | 20 | 20 | 30 | 30 | 30 | 20 |
| (D) | 5 | 5 | 5 | 5 | 5 | 5 | 5 | 5 | 5 | 5 | 5 |
| Izod impact strength (kgf · cm/cm) | 11 | 11 | 10 | 10 | 12 | 14 | 15 | 10 | 13 | 12 | 15 |
| Flexural modulus (kgf/cm$^2$) | 70,000 | 68,000 | 68,000 | 69,000 | 71,000 | 60,000 | 60,000 | 67,000 | 68,000 | 67,000 | 59,000 |
| Practical impact strength (cm) | 72 | 65 | 70 | 74 | 71 | 80 | 82 | 60 | 75 | 78 | 85 |
| Luminance (L*) | 85 | 72 | 70 | 65 | 65 | 73 | 70 | 84 | 58 | 62 | 65 |

From results of Table 1, it can be seen that the thermoplastic resin composition according to the present invention has good properties in terms of impact resistance, rigidity, whiteness and balance therebetween.

Specifically, it could be seen that the thermoplastic resin compositions of Examples 1 to 7 had an Izod impact strength of 10 kgf·cm/cm or more, a flexural modulus of 60,000 kgf·cm/cm or more, a practical impact strength of 65 cm or more, and a luminance of 65 or more, meaning that the thermoplastic resin compositions had good properties.

Conversely, the resin composition of Comparative Example 1 free from zinc sulfide had insufficient practical impact strength, the resin composition of Comparative Example 2 free from titanium dioxide had low luminance, and the resin compositions of Comparative Examples 3 and 4 prepared using a smaller amount of zinc sulfide without titanium dioxide had insufficient luminance and flexural modulus.

It should be understood that various modifications, changes, alterations, and equivalent embodiments can be made by those skilled in the art without departing from the spirit and scope of the present invention.

The invention claimed is:

1. A thermoplastic resin composition for laser direct structuring, comprising:
    about 50 wt % to about 80 wt % of a polycarbonate resin;
    about 1 wt % to about 15 wt % of an inorganic compound including titanium dioxide and zinc sulfide;
    about 10 wt % to about 40 wt % of a fibrous inorganic filler; and
    about 1 wt % to about 10 wt % of an additive for laser direct structuring,
    wherein the titanium dioxide and the zinc sulfide are present in a weight ratio of about 1:0.1 to about 1:5.

2. The thermoplastic resin composition for laser direct structuring according to claim 1, wherein the titanium dioxide and the zinc sulfide have a hardness difference of about 2 to about 5, as calculated by Equation 1:

Hardness difference (ΔMohs)=|(MH1−MH2)|,   [Equation 1]

where MH1 indicates Mohs's hardness of the titanium dioxide and MH2 indicates Mohs's hardness of the zinc sulfide.

3. The thermoplastic resin composition for laser direct structuring according to claim 2, wherein, in Equation 1, MH1 ranges from about 5.5 to about 7.5 and MH2 ranges from about 2.5 to about 3.5.

4. The thermoplastic resin composition for laser direct structuring according to claim 1, wherein the fibrous inorganic filler comprises glass fibers, carbon fibers, silica fibers, and/or ceramic fibers.

5. The thermoplastic resin composition for laser direct structuring according to claim 4, wherein the fibrous inorganic filler comprises glass fibers having an average diameter of about 5 μm to about 20 μm in cross-section, as measured by an optical microscope, and a pre-processing average length of about 2 mm to about 5 mm.

6. The thermoplastic resin composition for laser direct structuring according to claim 1, wherein the additive for laser direct structuring comprises a heavy metal composite oxide spinel and/or a copper salt.

7. The thermoplastic resin composition for laser direct structuring according to claim 6, wherein the additive for laser direct structuring is the copper salt, the copper salt comprising copper hydroxide phosphate, copper phosphate, copper sulfate, cuprous thiocyanate, and/or copper chromite.

8. The thermoplastic resin composition for laser direct structuring according to claim 6, wherein the additive for laser direct structuring is the heavy metal composite oxide spinel, the heavy metal composite oxide spinel being a compound represented by Formula 1:

where A is cadmium, chromium, manganese, nickel, zinc, copper, cobalt, iron, magnesium, tin, or titanium, and B is chromium, iron, aluminum, nickel, manganese, molybdenum, antimony, bismuth, or tin.

9. The thermoplastic resin composition for laser direct structuring according to claim 1, wherein the polycarbonate resin and the additive for laser direct structuring are present in a weight ratio of about 3:1 to about 80:1.

10. A molded article formed of the thermoplastic resin composition for laser direct structuring according to claim 1.

11. The molded article according to claim 10, wherein the molded article has an Izod impact strength of about 10 kgf·cm/cm to about 20 kgf·cm/cm, as measured on a ⅛" thick notched Izod specimen in accordance with ASTM D256.

12. The molded article according to claim 10, wherein the molded article has a flexural modulus of about 60,000 kgf/cm² to about 80,000 kgf/cm², as measured in accordance with ASTM D790.

13. The molded article according to claim 10, wherein the molded article has an average weight-dropping fracture height of about 65 cm to about 90 cm, at which dropping a weight on an injection-molded specimen having a size of 2 mm×5 cm×20 cm (thickness×width×length) results in 50% breakage of the specimen in a DuPont drop test after aging at room temperature for 6 hours.

14. The molded article according to claim 10, wherein the molded article has a luminance (L*) of about 65 to about 90, as measured in accordance with the Commission Internationale de l'Eclairage (CIE) Lab.

15. The molded article according to claim 10, wherein the molded article has an average weight-dropping fracture height of about 65 cm to about 90 cm, at which dropping a weight on an injection-molded specimen having a size of 2 mm×5 cm×20 cm (thickness×width×length) results in 50% breakage of the specimen in a DuPont drop test after aging at room temperature for 6 hours; and a luminance (L*) of about 65 to about 90, as measured in accordance with the Commission Internationale de l'Eclairage (CIE) Lab.

16. The thermoplastic resin composition for laser direct structuring according to claim 1, wherein a molded article formed of the thermoplastic resin composition has an average weight-dropping fracture height of about 65 cm to about 90 cm, at which dropping a weight on an injection-molded specimen having a size of 2 mm×5 cm×20 cm (thickness× width×length) results in 50% breakage of the specimen in a DuPont drop test after aging at room temperature for 6 hours; and a luminance (L*) of about 65 to about 90, as measured in accordance with the Commission Internationale de l'Eclairage (CIE) Lab.

* * * * *